(12) United States Patent
Fornara et al.

(10) Patent No.: US 9,039,822 B2
(45) Date of Patent: May 26, 2015

(54) CERAMIC INKS FOR INKJET PRINTERS

(75) Inventors: Dario Fornara, Novara (IT); Alan Nappa, Modena (IT); Tamara Verzotti, Bellinzago (IT); Paolo Prampolini, Castelnuovo Rangone (IT); Stefano Crespi, Busto Arsizio (IT); Giovanni Floridi, Novara (IT); Giuseppe Li Bassi, Gavirate (IT)

(73) Assignee: LAMBERTI SPA, Alibizzate (IT)

( * ) Notice: Subject to any disclaimer, the term of this patent is extended or adjusted under 35 U.S.C. 154(b) by 0 days.

(21) Appl. No.: 14/002,959

(22) PCT Filed: Feb. 9, 2012

(86) PCT No.: PCT/EP2012/052158
§ 371 (c)(1),
(2), (4) Date: Sep. 3, 2013

(87) PCT Pub. No.: WO2012/116878
PCT Pub. Date: Sep. 7, 2012

(65) Prior Publication Data
US 2013/0342593 A1    Dec. 26, 2013

(30) Foreign Application Priority Data
Mar. 3, 2011    (IT) .............................. VA2011A0006

(51) Int. Cl.
*C09D 11/00* (2014.01)
*C09D 11/30* (2014.01)
*C08G 69/44* (2006.01)
*C08G 81/00* (2006.01)
*C08L 77/12* (2006.01)
*C09D 11/326* (2014.01)

(52) U.S. Cl.
CPC ................. *C09D 11/30* (2013.01); *C08G 69/44* (2013.01); *C08G 81/00* (2013.01); *C08L 77/12* (2013.01); *C09D 11/326* (2013.01)

(58) Field of Classification Search
CPC ............................... C09D 11/30; C09D 1/322
USPC ................................. 106/31.6, 31.65, 31.75
See application file for complete search history.

(56) References Cited

U.S. PATENT DOCUMENTS

| 4,861,380 A | 8/1989 | Campbell et al. |
| 5,700,395 A | 12/1997 | Thetford et al. |
| 6,197,877 B1 | 3/2001 | Thetford et al. |
| 7,008,988 B2 | 3/2006 | Thetford et al. |

FOREIGN PATENT DOCUMENTS

| EP | 1840178 A1 | 10/2007 |
| JP | 2008184535 A | 8/2008 |
| WO | 2006126189 A1 | 11/2006 |

*Primary Examiner* — Veronica F Faison
(74) *Attorney, Agent, or Firm* — Mossman, Kumar & Tyler PC

(57) ABSTRACT

Ceramic inkjet inks comprising ceramic inorganic pigments having average particle size between 0.1 and 0.8 μm, an organic medium and a dispersant, the dispersant being the reaction product of a polyethyleneimine with a homo- or co-polyester based on lactic acid, and method for decorating green or fired ceramic bodies by the use of the above ceramic inkjet inks.

20 Claims, No Drawings

CERAMIC INKS FOR INKJET PRINTERS

FIELD OF THE INVENTION

The present invention relates to ceramic inkjet inks and to a method for decorating green or fired ceramic bodies by the use of inkjet printing. The ceramic inkjet inks of the invention comprise ceramic inorganic pigments having average particle size between 0.1 and 0.8 μm, dispersed in an organic medium, and a dispersant which is the reaction product of a polyethyleneimine and a homo- or co-polyester based on lactic acid.

BACKGROUND OF THE ART

Most traditional ceramic manufactured products, such as wall tiles and floor tiles, are made of a ceramic body that confers form and mechanical properties to the object; the ceramic body generally has some porosity and poor aesthetic qualities.

Said ceramic body, which is defined "green" or, alternatively, "fired", if previously fired, is then usually coated with a ceramic layer, called ceramic glaze; the ceramic glaze is completely sintered by firing, in such a way to gain suitable superficial aesthetic qualities and, in the meantime, to become a fluid-proof barrier; as a matter of fact, after firing, the ceramic glaze has usually no porosity and is generally resistant to abrasion and to the attack of chemical agents such as acids, bases, dyes.

The aesthetic finishing of the ceramic material can be completed by a decoration phase, that is by the application of sinterable and variously coloured ceramic materials (ceramic pigments) which are applied according to a precise drawing (décor).

The decor can be applied either on the green or fired ceramic body, on which the glaze was previously set, or, in the so called third firing decorations, after the firing, on the glaze.

Different techniques are used to transfer images to the ceramic substrate: i.e. screen printing and photogravure (commonly referred to as rotocolor). These technologies require flat substrate or with minimum roughness, they are suitable for mass production, but have very limited flexibility of new design set up and changeover between designs.

Another technique of printing decoration on ceramics is digital printing by inkjet technique.

Digital printing and decoration by inkjet technique is widely used in multiple sectors, such as graphic arts, textile industry, industrial marking and it is well known, both referring to printing equipments and also to the inks used.

Peculiarly in ceramic applications, the thermal treatment, which is required once the substrate has been printed, makes the conventional inks, that are used in the other applications and are mainly based on organic pigments, unsuitable for use.

Two kind of inks for inkjet printing of ceramics are known: inks constituted by solutions of metallic cations and inks based on dispersions of inorganic pigments.

Inorganic pigments used for traditional decoration in ceramic, such as screen printing and photogravure, have average particle size above 1 μm.

When inkjet inks based on dispersions of inorganic pigments are concerned, it is mandatory that the inorganic pigments are well dispersed in the liquid medium and possess nano-scale dimensions (i.e. below 1 μm in diameter), for the ceramic inkjet ink flows through small nozzles (30-100 μm in diameter) at high speed.

Nano-scale dimensions of the inorganic pigments are usually obtained by milling with microspheres the pigments, pre-dispersed in the medium, in the presence of a milling aid.

Examples of ceramic inkjet inks based on dispersions of inorganic pigments in polar organic mediums are described in EP 2159269, WO 2006/126189, EP 1840178; the inks are generically said to contain anti-settling and/or dispersing agents.

Nonetheless, there is still the industrial need for improved ceramic inkjet inks based on inorganic ceramic pigments having low viscosity, solid particle size below 0.8 □m, long shelf life and that can be printed on ceramic surfaces and passed through a high temperature kiln to form a permanently glazed print. The reaction products of polyamines and carboxyl terminated polyesters with formation of amidic and/or salt linkages are known products that belongs to a wide class of dispersants, which have been described in many patents; by way of example we cite: U.S. Pat. No. 4,224,212, U.S. Pat. No. 4,861,380, U.S. Pat. No. 5,700,395, U.S. Pat. No. 6,197,877 and U.S. Pat. No. 7,008,988. Such wide class of dispersants is generally suitable for use as dispersing agents for various solids in organic liquids. JP 2008184535 describes a reaction product of polyethylenimine with a co-polyester of caprolactone and lactic acid as dispersant mainly for the preparation of light filters.

Nonetheless, none of the above cited documents suggests that the reaction product of a polyethyleneimine and a homo- or co-polyester based on lactic acid may be suitable as adjuvant for the preparation and stabilization of inkjet inks for ceramic.

It has now been found that the reaction product of a polyethyleneimine and a homo- or co-polyester based on lactic acid can conveniently be used in the preparation of ceramic inkjet inks for inkjet printing machines.

Surprisingly, the reaction product of a polyethyleneimine and a co-polyester based on lactic acid, is perfectly suitable, in the milling phase, to fluidize the pre-dispersed inorganic pigments allowing their rapid milling and to subsequently prevent agglomeration and sedimentation of the nano-scale inorganic pigments in the final ink.

SUMMARY OF THE INVENTION

In one aspect, the invention is a ceramic inkjet ink comprising a ceramic inorganic pigment, an organic medium and a dispersant which is the reaction product of a polyethyleneimine and a homo- or co-polyester, based on lactic acid, of formula (1)

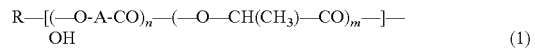

(1)

wherein:

R is hydrogen or a polymerization terminating group;

A is a linear or branched alkylene radical deriving from a hydroxycarboxylic acid having between 2 and 20 carbon atoms or lactone thereof;

n and m are integers, wherein said ceramic inorganic pigment has average particle size between 0.1 and 0.8 μm.

In another aspect, the invention is a method for decorating green or fired ceramic bodies by inkjet printing that comprises the following steps:

i. a ceramic inkjet ink comprising a ceramic inorganic pigment having to average particle size between 0.1 and 0.8 μm is prepared by milling an inorganic pigment having initial average particle size between 1.0 and 10.0 μm in an organic medium in the presence of a dispersant which is the reaction product of a polyethyleneimine and a homo- or co-polyester, based on lactic acid, of formula (1)

(1)

wherein:

R is hydrogen or a polymerization terminating group;

A is a linear or branched alkylene radical deriving from a hydroxycarboxylic acid having between 2 and 20 carbon atoms or lactone thereof;

n and m are integers;

ii. a glaze is spread on the surface of the green or fired ceramic body;

iii. the decoration is made by means of inkjet printing, by using one or more ceramic inkjet inks according to step i.;

iv. the obtained substrate is fired at a temperature comprised between 900 and 1250° C. for 15-240 minutes.

DETAILED DESCRIPTION OF THE INVENTION

As it is well known, ceramic inorganic pigments are inorganic pigments dispersed in glass matrixes which are stable and elevated temperatures (up to about 1300° C.) and are used in ceramic processing.

The ceramic inorganic pigments useful for the ceramic inkjet inks of the invention differ from conventional ceramic inorganic pigments because of their particle size, which makes them suitable for inkjet applications.

The ceramic inorganic pigment of the ceramic inkjet ink of the present invention shall exhibit an average particle size ($d_{50}$) of less than 0.8 μm and preferably from 0.1 to 0.5 μm, most preferably from 0.1 to 0.3 μm, as measured by laser diffraction particle size analysis.

The average particle size, i.e. the average equivalent diameter, is the diameter where 50 percent by weight of the particles have a larger equivalent diameter, and the other 50 percent by weight have a smaller equivalent diameter.

Any of the recognized classes of pigments used in ceramic decoration (ceramic pigments) may be used as the ceramic inorganic pigment, such as, for example, zirconates and silicates of Cr, Sn, Ni, Pr, Fe, Co and oxides thereof, and preferably those ceramic pigments selected from Zr—Pr, Zr—Pr—Si, Zr—Fe—Si, Ti—Cr—Sb, Co—Al—Zn, Zr—Va—Si, Fe—Cr—Co—Ni, Cr—Ca—Sn—Si, Co—Si, and Fe—Cr—Zn.

A list of utilizable ceramic pigments may be found in the CPMA Classification and Chemical Descriptions of the Complex Inorganic Color Pigments, Fourth Edition (2010), under the use category A.

The organic medium present in the ceramic inkjet ink is preferably a polar organic medium or a substantially non-polar aliphatic or aromatic hydrocarbon or halogenated hydrocarbon, including mixtures thereof.

For example, suitable polar media are selected from one of glycol ethers or glycol ether esters exhibiting a flash point in excess of 75° C., such as polypropylene glycol, tripropylene glycol monomethyl ether (TPM), tripropylene glycol butyl ether (TPB), butyl glycol ether acetate.

Examples of suitable non-polar media are long chain aliphatic solvents such as isoparaffins, commercially available as ISOPAR products from ExxonMobil Chemical and the corresponding products from BP and Total, dearomatised aliphatic hydrocarbons, commercially available as EXXSOL from ExxonMobil Chemical and the corresponding products from Total, 2-isopropylnaphthalene and 2,6-diisopropylnaphthalene. The preferred organic mediums are tripropylene glycol monomethyl ether and tripropylene glycol butyl ether.

The dispersant of the disclosure, which is the reaction product of a polyethyleneimine and a homo- or co-polyester of formula (1), is obtained from the amidation and/or salification of a linear or branched polyethyleneamine with the homo- or co-polyester of formula (1).

Branched polyethyleneimines of differing molecular weight are commercially available, by way of example from BASF (under the trade name Lupasol®) and Nippon Shokubai (under the trade name Epomin®).

Linear polyethyleneimines can be prepared by hydrolysis of poly (N-acyl) alkyleneimines as described by Takeo Saegusa et al in Macromolecules, 1972, Vol. 5, page 4470.

The polyethyleneimine is preferably branched and has a weight average molecular weight from 100 to 600,000, more preferably from 1,000 to 200,000, even more preferably from 1,000 to 100,000 and especially from 1,000 to 70,000.

In formula (1) m is not greater than 100, preferably not greater than 50 and more preferably not greater than 20, and in is not lower than 5; n is not greater than 100, preferably not greater than 50 and more preferably not greater than 20 and n can be as low as 0.

When in formula (1) n is different from 0, the co-polyester of formula (1) can be obtained by random or block polymerization of the hydroxycarboxylic acids having between 2 and 20 carbon atoms or lactone thereof with lactic acid.

The homo- or co-polyester based on lactic acid of formula (1) may be prepared by polymerization of lactic acid and hydroxycarboxylic acids or lactone thereof at temperature between 150 and 180° C., as described for example in U.S. Pat. No. 4,224,212; in the preparation of the polyester it is preferred to include an esterification catalyst such as a tin salt of an organic acid, for example dibutyl tin dilaurate, a tetraalkyl titanate, for example tetrabutyltitanate, a zinc salt of an organic acid, for example zinc acetate, a zirconium salt of an aliphatic alcohol, for example zirconium isopropoxide, toluene sulphonic acid or a strong organic acid such as a halo acetic acid, for example trifluoro acetic acid.

In formula (1), (—O-A-CO)$_n$ is the residue of hydroxycarboxylic acids or lactones, such as 12-hydroxydodecanoic acid, 5-hydroxydodecanoic acid, 5-hydroxydecanoic acid, 4-hydroxydecanoic acid, ε-caprolactone and 12-hydroxystearic acid.

In case that n is different from 0, the co-polyester may be random or block, and the molar ratio of lactic acid and the other acid(s) m:n is from 10:1 to 1:10.

In the preferred embodiment the molar ratio of lactic and the other hydroxycarboxylic acid m:n is from 2:1 to 1:2.

The homo- or co-polyester based on lactic acid shall be carboxyl terminated, and may be initiated with an organic carboxylic acid that can be aromatic, heterocyclic, alicyclic or preferably aliphatic and is optionally substituted by halogen, $C_{1-4}$-alkoxy or hydroxy groups. Preferably, the organic carboxylic acid is unsubstituted. When the organic carboxylic acid is aliphatic, it may be linear or branched, saturated or unsaturated, but is preferably saturated. The total number of carbon atoms in the initiating organic carboxylic acid can be as high as 50, but it is preferred that it contains not less than 8 and more preferably not less than 12 carbon atoms. It is also preferred that the organic carboxylic acid contains not greater than 30, more preferably not greater than 25 and especially not greater than 20 carbon atoms.

Particularly useful effects have been obtained with homo- or co-polyesters based on lactic acid having number-average molecular weight between 800 and 2,000 and polyethyleneimine having a number-average molecular weight of from 1,000 to 70,000.

The dispersant of the invention is obtained by reacting the polyethyleneimine and the above described homo- or co-polyester based on lactic acid at temperature between 50 and 250° C. and preferably in an inert atmosphere. Preferably, the temperature is not less than 80° C. and especially not less than 100° C. and not greater than 150° C.

The weight ratio of homo- or co-polyester based on lactic acid to polyethyleneimine is preferably from 1 to 100.

At least two moles of polyester shall be attached to each mole of polyethylenimine.

The viscosity of the ceramic inkjet ink is between 5 and 50 mPa·s, and preferably between 8 and 30 mPa·s.

The ceramic inkjet ink typically contains from 5 to 60% by weight of the pigment, the precise quantity depending on the nature of the pigment and on the relative densities of the pigment and the organic medium. Preferably the ceramic inkjet ink contains from 15 to 45% by weight of the pigment. The content of organic medium is from 30 to 80% by weight based on the total weight of the ink, preferably from 45 to 80% by weight.

The content of the dispersant in the ink is between 2 and 15% by weight based on the total weight of the ink, preferably from 4 to 10% by weight.

The ceramic inkjet ink of the invention is prepared by milling a commercial ceramic inorganic pigment having average particle size between 1.0 and 10.0 μm, in the presence of the organic medium and the reaction product of a polyethyleneimine and the homo- or co-polyester based on lactic acid of formula (1).

The pigment, the organic medium and the reaction product of a polyethyleneimine and homo- or co-polyester based on lactic acid may be mixed in any order, the mixture then being subjected to a mechanical treatment to reduce the particles of the pigment to an appropriate size by milling with milling beads having diameters from 0.1 to 0.5 mm.

When the pigment is milled, the temperature is preferably not greater than 45° C.

The invention is further illustrated by the following examples wherein all references are to parts by weight unless expressed to the contrary.

EXAMPLES

Preparation of Dispersant A

A mixture of 230.4 parts of ricinoleic acid and 87 parts of a 80% water solution of lactic acid was stirred, under nitrogen, and heated at 100° C.; vacuum was gradually applied to remove the lactic acid dilution water. The temperature was decreased to 40° C. and 0.6 parts of dibutyl tin dilaurate were added; the mixture was heated at 170° C. for 13 hours removing the esterification water. The final product was an oil liquid with an acid value of 51.0 mg KOH/g (Polyester 1).

A mixture of 250.0 parts of Polyester 1 and 19.7 parts of LUPASOL PR 8515 (polyethylenimine from BASF having MW 2000) was stirred, under nitrogen, and heated at 120° C. for 2 hours. The dispersant was obtained as a viscous liquid with an acid value of 45.0 mg KOH/g.

Preparation of Dispersant B

A mixture of 218.4 parts of ricinoleic acid and 164.5 parts of a 80% water solution of lactic acid was stirred, under nitrogen, and heated at 100° C.; vacuum was gradually applied to remove the lactic acid dilution water. The temperature was decreased to 40° C. and 0.7 parts of dibutyl tin dilaurate were added; the mixture was heated at 180° C. for 16 hours removing the esterification water. The final product was an oil liquid with an acid value of 51.5 mg KOH/g (Polyester 2).

A mixture of 260.0 parts of Polyester 2 and 20.4 parts of LUPASOL PR 8515 (polyethylenimine from BASF having MW 2000) was stirred, under nitrogen, and heated at 120° C. for 2 hours. The dispersant was obtained as a high viscous liquid with an acid value of 48.6 mg KOH/g.

Preparation of Dispersant C 640 parts of a 80% water solution of lactic acid were stirred, under nitrogen, and heated at 100° C.; vacuum was gradually applied to remove the lactic acid dilution water. The temperature was decreased to 40° C. and 1.3 parts of dibutyl tin dilaurate were added; the mixture was heated at 180° C. for 16 hours removing the esterification water. The final product was an hard solid with an acid value of 54.5 mg KOH/g (Polyester 3).

A mixture of 185.5 parts of Polyester 3 and 14.6 parts of LUPASOL PR 8515 (polyethylenimine from BASF having MW 2000) was stiffed, under nitrogen, and heated at 120° C. for 2 hours. The dispersant was obtained as an hard solid with an acid value of 46.6 mg KOH/g.

Preparation of Dispersant D

A mixture of 77.7 parts of ϵ-caprolactone and 76.7 parts of a 80% water solution of lactic acid was stirred, under nitrogen, and heated at 100° C.; vacuum was gradually applied to remove the lactic acid dilution water. The tempearture was decreased to 40° C. and 0.3 parts of dibutyl tin dilaurate were added; the mixture was heated at 170° C. for 12 hours removing the esterification water. The final product was an oil liquid with an acid value of 52.0 mg KOH/g (Polyester 4)

A mixture of 150.0 parts of Polyester 4 and 10.7 parts of LUPASOL PR 8515 (polyethylenimine from BASF having MW 2000) was stirred, under nitrogen, and heated at 120° C. for 2 hours. The dispersant was obtained as a viscous with an acid value of 45.6 mg KOH/g.

Preparation of the Ceramic Inkjet Inks

Four ceramic inkjet inks were prepared, by using in each a different dispersant (Dispersant A, Dispersant B, Dispersant C and Dispersant D). 7.8 g of dispersant are stirred and dissolved it in 89.7 g of Dowanol TPM in 5 minutes.

52.5 g of blue pigment of cobalt silicoaluminate are added and mixed for 5 minutes.

The blue pigment has $d_{50}$=2.0 μm, measured by particle size analysis (Malvern Instruments Mastersizer 2000).

200 g of grinding media (YTZ® Grinding Media 0.3 mm, made of Yttrium

Stabilized Zirconia Grinding Beads, produced by Nikkato Corporation) and 60 g of the mixture prepared as described above are charged in a 125 ml grinding jar and milled in a planetary ball mill (PM 200 produced by Retsch). All the inks prepared with the dispersants of the invention showed a viscosity at 35° C. lower than 30 mPa·s.

The dispersant prepared in the preceding Examples were evaluated by measuring their solubility in Dowanol TPM, to the particle size of the pigment measured as $d_{50}$ after 3 hours milling and the stability of the corresponding ceramic inkjet ink was checked after 30 days storage at room temperature.

Solubility was determined at 20° C. at 8% by weight in Dowanol TPM after stirring with a magnetic stirrer for 5 minutes.

The results are reported in Table 1

TABLE 1

| Dispersant | Solubility Medium | After 5' |
|---|---|---|
| Dispersant A | TPM | soluble |
| Dispersant B | TPM | soluble |
| Dispersant C | TPM | soluble* |
| Dispersant D | TPM | soluble |

*after heating

The particle sizes after milling ($d_{50}$) are reported in Table 2. Particle size analysis has been performed by using a Malvern Instruments Mastersizer 2000.

TABLE 2

| Dispersant in the ink | Particle size $d_{50}$ (μm) |
|---|---|
| Dispersant A | 0.25 |
| Dispersant B | 0.25 |
| Dispersant C | 0.47 |
| Dispersant D | 0.25 |

Stability was determined by storing the ceramic inkjet inks at room temperature. Ceramic inkjet inks are considered stable if they do not visually show any solid sediment 30 days after their preparation.

The inks prepared form Dispersant A, Dispersant B, Dispersant C, Dispersant D are stable. From the results reported in Tables 1 and 2 the dispersants of the invention are soluble in the organic medium and their use in millbased ink preparations give compositions that have particle size distributions suitable for ink-jet decoration of ceramics. Moreover the dispersants of the invention give millbased inks that have good stability.

The invention claimed is:

1. A ceramic inkjet ink comprising:
   a ceramic inorganic pigment having an average particle size of from about 0.1 to about 0.8 μm,
   an organic medium and
   a dispersant which is the reaction product of a polyethyleneimine and a homo- or co-polyester of formula (1)

R—[(—O-A-CO)*n*-(-O—(CH)CH3-CO)*m*-]-OH     (1)

wherein:
   R is hydrogen or a polymerization terminating group;
   A is a linear or branched alkylene radical deriving from a hydroxycarboxylic acid having from about 2 to about 20 carbon atoms or a lactone thereof; and
   n and m are integers.

2. The ceramic inkjet ink of claim 1 wherein the ceramic inorganic pigment has an average particle size from about 0.1 to about 0.5 μm.

3. The ceramic inkjet ink of claim 1 wherein the dispersant is obtained from the amidation and/or salification of a linear or branched polyethyleneamine with the homo- or co-polyester of formula (1).

4. The ceramic inkjet ink of claim 3 wherein the homo- or co-polyester of formula (1) is a co-polyester.

5. The ceramic inkjet ink of claim 4 wherein m:n is from about 10:1 to about 1:10.

6. The ceramic inkjet ink of claim 5 wherein m:n is from about 2:1 to about 1:2.

7. The ceramic inkjet ink of claim 3 wherein the homo- or co-polyester of formula (1) has a number average molecular weight of from about 800 to about 2,000.

8. The ceramic inkjet ink of claim 7 wherein the polyethyleneimine has a number average molecular weight of from about 1,000 to about 70,000.

9. The ceramic inkjet ink of claim 1 wherein the weight ratio of the homo- or co-polyester of formula (1) to polyethyleneimine is from about 1 to about 100.

10. The ceramic inkjet ink of claim 1 wherein the ceramic inkjet ink comprises from about 5 to about 60% by weight of the pigment.

11. The ceramic inkjet ink of claim 10 wherein the ceramic inkjet ink comprises from about 30 to about 80% by weight of the organic medium.

12. The ceramic inkjet ink of claim 11 wherein the ceramic inkjet ink comprises from about 2 to about 15% by weight of the dispersant.

13. A method for decorating green or fired ceramic bodies by inkjet printing comprising:
    milling a ceramic inorganic pigment having average particle size of from about 1.0 to about 10 μm in an organic medium in the presence of a dispersant which is a reaction product of a polyethyleneimine and a homo- or co-polyester of formula (1), R—[(—O-A-CO)*n*-(-O—(CH)CH3-CO)*m*-]-OH     (1)

wherein:
    R is hydrogen or a polymerization terminating group;
    A is a linear or branched alkylene radical deriving from a hydroxycarboxylic acid having from about 2 and about 20 carbon atoms or a lactone thereof; and
    n and m are integers
    until the average particle size of the pigment is between 0.1 and 0.8 μm to produce a ceramic inkjet ink;
    spreading a glaze on the surface of a green or fired ceramic body;
    inkjet printing a decoration onto the green or fired ceramic body by using the ceramic inkjet ink: and
    firing the green or fired ceramic body at a temperature of from about 900 to about 1250° C. for from about 15 to about 240 minutes.

14. The method of claim 13 wherein the ceramic inorganic pigment has an average particle size from about 0.1 to about 0.5 μm.

15. The method of claim 13 wherein the dispersant is obtained from the amidation and/or salification of a linear or branched polyethyleneamine with the homo- or co-polyester of formula (1).

16. The method of claim 15 wherein the homo- or co-polyester of formula (1) is a co-polyester.

17. The method of claim 16 wherein m:n is from about 10:1 to about 1:10.

18. The method of claim 17 wherein m:n is from about 2:1 to about 1:2.

19. The method of claim 14 wherein the homo- or co-polyester of formula (1) has a number average molecular weight of from about 800 to about 2,000.

20. The method of claim 19 wherein the polyethyleneimine has a number average molecular weight of from 1,000 to 70,000.

* * * * *